I. W. McGAFFEY,

Assignor to E. B. PRESTON.

Nozzles for Hose.

No. 9,081. Reissued Feb. 17, 1880.

Witnesses:
F. B. Townsend
Edmund Adcock

Inventor:
Ives W. McGaffey
per Munday & Evarts
Attorneys.

M. PETERS, PHOTO-LITHOGRAPHER, WASHINGTON, D. C.

UNITED STATES PATENT OFFICE.

IVES W. McGAFFEY, OF CHICAGO, ILL., ASSIGNOR TO EVERETT B. PRESTON.

NOZZLE FOR HOSE.

SPECIFICATION forming part of Reissued Letters Patent No. 9,081, dated February 17, 1880.

Original No. 170,753, dated December 7, 1875. Application for Reissue filed January 19, 1880.

*all whom it may concern:*

Be it known that I, IVES W. McGAFFEY, of Chicago, in the county of Cook and State of Illinois, have invented certain Improvements in Nozzles for Hose, of which the following is a specification.

This invention relates to that class of nozzles which may be made at pleasure to throw a solid stream or a shower of spray; and the invention consists in the novel construction, as more particularly hereinafter specified.

Figure 1:
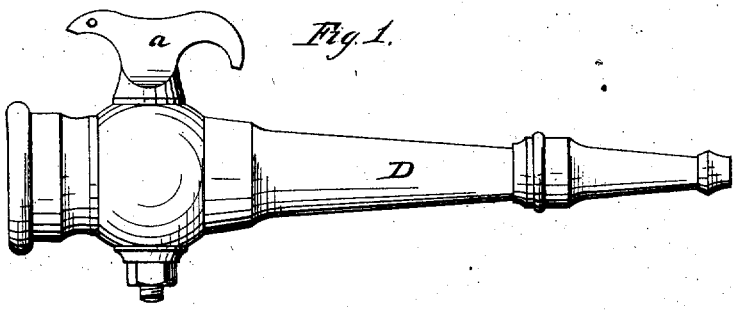
Figure 2:
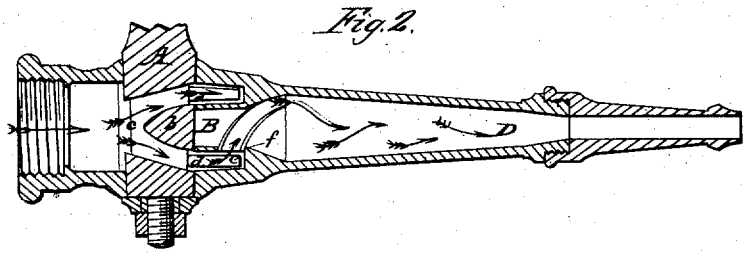
Figure 3:
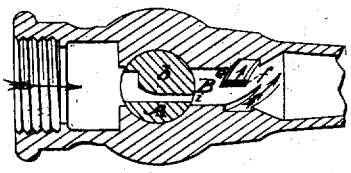
Figure 4:
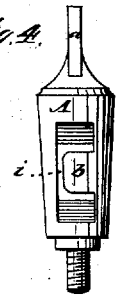
Figure 5:
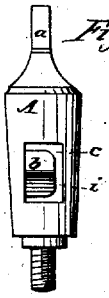
Figure 6:
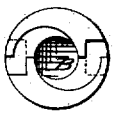
Figure 7:
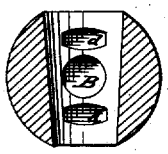

In the accompanying drawings, which form a part of this specification, Figure 1 represents a side view of my improved nozzle. Fig. 2 is a vertical central longitudinal section of Fig. 1. Fig. 3 is a horizontal central longitudinal section of the same figure, the forward portion of the pipe or barrel being broken off. Figs. 4 and 5 are views from opposite sides of the valve-plug. Fig. 6 is a diagram showing approximately the course of the spiral waterways. Fig. 7 is a cross-section of the plug-chamber, the view looking toward the point of the nozzle.

Like letters of reference made use of in the several figures indicate like parts.

In said drawings, the part marked A represents the body of a conical plug, fitted to revolve in the usual manner within a conical aperture cut with its axis transverse to the bore of the nozzle. A thumb-piece, *a*, extends from the plug, its respective ends having a different shape, for the purpose of indicating the position of the water-ways. The water-way through this plug is of peculiar form, as will be noticed, being V-shaped and partially filled by a partition or obstruction, *b*. When the plug is in the position shown in Figs. 1, 2, and 3 of the drawings the smaller opening or apex *c* of the water-way is presented toward the incoming water, and the two branches coincide with two channels, *d d*, in the body of the nozzle and at the sides outside of the main through-port B, which through-port is at the moment closed, or nearly closed, as the case may be, by the partition *b*. The water, in this condition of things, is divided into two streams, entering the channels *d d*, the construction and operation of which channels will be presently explained. When the plug is turned half-way around from the position shown, so that the apex *c* of the water-way is to the front, the obstruction will be removed from the through-port B and carried around to the rear, and at the same time the channels *d d* are closed. When in this position the water passes directly through and is discharged from the end of the nozzle in an unbroken stream, like the common plain nozzle.

Now, with reference to the said channels *d d*, formed in the body of the metal outside of the main central bore, entering at either side, as seen at Fig. 7, the purpose of these channels is to take the water away from the main direct channel and return it in a line approximately transverse to its former direction, and in a circular course with accelerated motion, which acceleration is caused by the contraction of the said channels *d d* at their egress *e* into the main bore, the egress-orifices being so formed, in connection with the abutment *f* and the groove sunk into the face of the bore, that the water passes into the tapering barrel D in a spiral sheet, winding around the inner surface thereof, causing the water to be discharged from the end of the nozzle in the form of spray.

The abutments *f* operate only upon the water when it passes through the channels *d d*, being sunken sufficiently within the surface of the main bore as not to impede or disintegrate the current when passing through said main bore from the central port.

It will be seen that the partition *b* in the water-way of the plug (see Figs. 4 and 5) is cut away at one side, as at *i*, so that when the plug is turned a little past the central position, (shown in Fig. 2,) as at Fig. 3, the central port is partially, while the side channels still remain fully, open. The object of this arrangement is to give greater volume and range to the spray when desired.

It will be found that by various adjustment of the plug in my improved nozzle a great variety of jets may be thrown, varying from a solid unbroken stream to the finest spray, and susceptible of regular gradation from a cloudy mist to large rain-drops, at short or long range, as desired, and greater or less volume.

Having thus described my invention, I claim as new and desire to secure by Letters Patent—

1. The plug A, perforated by a divided water-way, the divisions of which are separated by a partition, *b*, which, in turn, is furnished with a passage, *i*, independent of the two branches of the water-way, substantially as specified.

2. The nozzle-pipe made with a central through-bore, which, when the plug is removed, is a straight unobstructed passage-way, and provided with one or more lateral channels, *d*, entering from the plug-chamber and turning into the central bore between the plug-chamber and the point of the nozzle, in combination with the plug A, furnished with the V-shaped water-way, substantially as specified.

3. The nozzle-pipe provided with a lateral diverging channel or channels, *d*, when said channels are contracted at their exit into the bore for the purpose of accelerating the diverted current, substantially as specified.

4. The combination of the tapering barrel D, the plug A, provided with the V-shaped water-way, and the channels *d*, constructed and arranged substantially as specified.

5. The combination, in a hose-nozzle, of two water-ways controlled by the same plug, one water-way being a through-way for throwing a solid stream, and the other being a passage or passages constructed to give a spiral direction to the water for throwing spray, substantially as specified.

6. The combination, with a nozzle, of an additional water way or ways constructed to give a spiral direction to the current of water passing through the pipe, whereby spray can be produced, substantially as specified.

7. The hose nozzle or barrel wherein are combined a taper plug, perforated by a through water-way, and a side passage or passages for giving a spiral direction to the current, said passage or passages being controlled by the plug at the will of the operator, for the purpose of producing different kinds of spray, substantially as specified.

8. The combination, with the nozzle, having the additional water-way constructed to spiral the current, of a tapering barrel or bore and the plug for changing the current from one water-way to the other, substantially as specified.

9. The nozzle having a through passage-way for throwing a solid stream and a side passage or passages for giving a spiral direction to the current, in combination with a plug constructed to admit water to both sets of passages at the same time, substantially as and for the purpose set forth.

IVES W. McGAFFEY.

Witnesses:
H. M. MUNDAY,
EDW. S. EVARTS.